(12) United States Patent
Folberth et al.

(10) Patent No.: US 10,616,103 B2
(45) Date of Patent: Apr. 7, 2020

(54) CONSTRUCTING STAGING TREES IN HIERARCHICAL CIRCUIT DESIGNS

(71) Applicant: International Business Machines Corporation, Armonk, NY (US)

(72) Inventors: Harald Folberth, Boeblingen (DE); Sven Nitzsche, Karlsruhe (DE); Sven Peyer, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 15/828,715

(22) Filed: Dec. 1, 2017

(65) Prior Publication Data
US 2019/0173781 A1 Jun. 6, 2019

(51) Int. Cl.
*G06F 17/50* (2006.01)
*H04L 12/753* (2013.01)
*G06F 1/10* (2006.01)

(52) U.S. Cl.
CPC ............... *H04L 45/48* (2013.01); *G06F 1/10* (2013.01); *G06F 17/5045* (2013.01); *G06F 17/5081* (2013.01); *G06F 17/5077* (2013.01); *G06F 2217/62* (2013.01); *G06F 2217/84* (2013.01)

(58) Field of Classification Search
CPC .... G06F 1/10; G06F 17/5068; G06F 17/5072; G06F 17/5077; G06F 17/5081; G06F 17/5045; G06F 2217/62; H04L 45/48
USPC ........................................................ 716/113
See application file for complete search history.

(56) References Cited

U.S. PATENT DOCUMENTS

| 5,686,845 | A | 11/1997 | Erdal et al. |
| 6,698,006 | B1 | 2/2004 | Srinivasan et al. |
| 6,751,786 | B2 | 6/2004 | Teng et al. |
| 8,095,904 | B2 | 1/2012 | Hentschke et al. |
| 8,171,447 | B1 | 5/2012 | Balsdon et al. |

(Continued)

OTHER PUBLICATIONS

Han, Y., "Graphics Processing Unit-Based Computer-Aided Design Algorithms for Electronic Design Automation," All Graduate Theses and Dissertations Paper, 2014, 145 pages. digitalcommons.usu.edu/cgi/viewcontent.cgi?article=4904&context=etd.

(Continued)

*Primary Examiner* — Paul Dinh
(74) *Attorney, Agent, or Firm* — Alex Harvey (57) ABSTRACT

A method can include receiving design data of the integrated circuit, the design data indicates a set of sub-units partitioning an area of an integrated circuit, and a clock tree coupling the sub-units, the clock tree including a selected memory element, a predecessor memory element, and successor elements; determining a valid placement region for relocating the selected memory element; generating grid comprising first set of perpendicularly intersecting lines through the selected memory element, predecessor memory element, and successor elements; extending the grid to include second set of perpendicularly intersecting lines through vertices of the valid placement region and through intersections between edges of the valid placement region and the first set of perpendicularly intersecting lines; determining, within the valid placement region, a point in the extended grid having a minimum total rectilinear distance to the predecessor memory element and the successor elements; relocating the memory element to the determined point.

20 Claims, 6 Drawing Sheets

(56) References Cited

U.S. PATENT DOCUMENTS

| | | |
|---|---|---|
| 8,484,604 B2 | 7/2013 | Jiang et al. |
| 8,539,419 B2 | 9/2013 | Rao et al. |
| 9,135,375 B1 | 9/2015 | Sood et al. |
| 9,552,454 B2 | 1/2017 | Chowdhury et al. |
| 2008/0028352 A1* | 1/2008 | Birch .................. G06F 17/5077 716/112 |
| 2010/0049481 A1* | 2/2010 | Walker ...................... G06F 1/10 703/2 |
| 2012/0240090 A1* | 9/2012 | Shirai ................. G06F 17/5077 716/113 |
| 2012/0240091 A1 | 9/2012 | Sunder et al. |
| 2012/0299627 A1* | 11/2012 | Taskin ...................... G06F 1/10 327/141 |
| 2013/0047127 A1 | 2/2013 | Arunachalam |
| 2015/0213188 A1* | 7/2015 | Chowdhury ........ G06F 17/5081 716/114 |

OTHER PUBLICATIONS

Saha et al., "Obstacle Avoiding Delay Equalization for Rectilinear Clock Tree Routing based on a Game Theoretic Approach," International Journal of Engineering and Innovative Technology (IJEIT), vol. 3, Issue 4, Oct. 2013, pp. 341-349. www.ijeit.com/Vol%203/Issue%204/IJEIT1412201310_58.pdf.

* cited by examiner

CONSTRUCTING STAGING TREES IN HIERARCHICAL CIRCUIT DESIGNS

BACKGROUND

The present disclosure relates to electronic circuits, and more specifically, to improving the layout of control clock trees in hierarchical circuit designs.

Very large scale integrated circuit (VLSI) designs can incorporate high speed circuits that execute functions at clock rates of several billions of cycles per second. The functions executed by these circuits are often partitioned into several stages, forming a pipeline to improve speed and overall performance. In a hierarchical VLSI design, the function partitions can be allocated to disparate hierarchical sub-units or cells to, for example, reduce design time and improve testing efficiency. To enable these disparate partitions to perform an integrated function, centrally generated control clock signals can be used to synchronize the generation of outputs from a given stage of the integrated with the consumption of inputs by another stage. Synchronization within individual partitions is also necessary. One method of addressing the synchronization problem is to distribute control clock signals across a design using a staging clock tree having multiple levels of staging latches (e.g., a staging tree). The staging latches then distribute the clock control signals to within a given sub-unit and between multiple sub-units.

SUMMARY

According to embodiments of the present disclosure, a method for improving a layout of a clock tree in an integrated circuit can include receiving design data of the integrated circuit, where the design data indicates a set of sub-units partitioning an area of the integrated circuit, and a clock tree coupling the sub-units. The clock tree includes a selected memory element, a predecessor memory element, and successor elements. The method further includes determining a valid placement region for relocating the selected memory element. The method further includes generating grid comprising a first set of perpendicularly intersecting lines through the selected memory element, the predecessor memory element, and the successor elements. The method further includes extending the grid to include a second set of perpendicularly intersecting lines through vertices of the valid placement region and through intersections between edges of the valid placement region and the first set of perpendicularly intersecting lines. The method then includes determining, within the valid placement region, a point in the extended grid having a minimum total rectilinear distance to the predecessor memory element and to the successor elements. The method then includes relocating the memory element to the determined point.

Other embodiments are directed to systems and computer program products for implementing the methods described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic circuits, more particular aspects relate to improving the layout of control clock trees in hierarchical circuit designs. While the present disclosure is not necessarily limited to such applications, various aspects of the disclosure may be appreciated through a discussion of various examples using this context.

Embodiments of this disclosure are based on the recognition that the placement of memory elements in a clock tree of an integrated circuit design can be improved (e.g., optimized) using Hanan grids that are extended to include valid placement regions for the memory elements. Given a design for an integrated circuit having hierarchical sub-units, a clock tree having latch stages (e.g., a staging tree or control clock tree), an initial Hanan Grid can be generated using the location of each latch and sink in the clock tree as vertices. The Hanan Grid can then be extended for a given latch in the clock tree to include vertices of a valid placement region for the latch, as well as any intersections between the initial Hanan Grid and an edge (e.g., a diagonal edge) of the valid placement region. The extended Hanan Grid can then be used to determine a relocation point for the latch, such that the sum of rectilinear distances from the relocation point to a predecessor latch and all successor latches and sinks is minimized.

This technique, when used with a quadri-section algorithm for selecting appropriate sub-units for placing relocated latches, can reduce the number of sub-unit crossings in an integrated circuit design, reduce clock tree wiring length, and reduce overall power consumption. These advantages can be realized without changing the overall topology of integrated circuit. More specifically, the technique does not change clock signal arrival time, nor does it require the insertion of additional clock states in to the integrated circuit design.

As used herein, a Hanan Grid is a grid formed through a finite set (e.g., one or more) of points (e.g., a generating set of points) in a plane by generating horizontal and vertical lines (e.g., perpendicularly intersecting lines) through the set of points. Points or vertices in the Hanan Grid are the generating set of points as well as the points at the intersections of the horizontal and vertical lines. In some embodiments, while a Hanan Grid contains a minimum Rectilinear Steiner Tree for the set of points used to construct the grid, finding a minimum Rectilinear Steiner Tree by exhaustive search, without limiting constraints to limit the search space, can be intractable or impractical. Embodiments of the present disclosure provide constraints to enable a practical exhaustive search of an extended Hanan Grid for improving the placement of clock tree memory elements.

Figure 1:
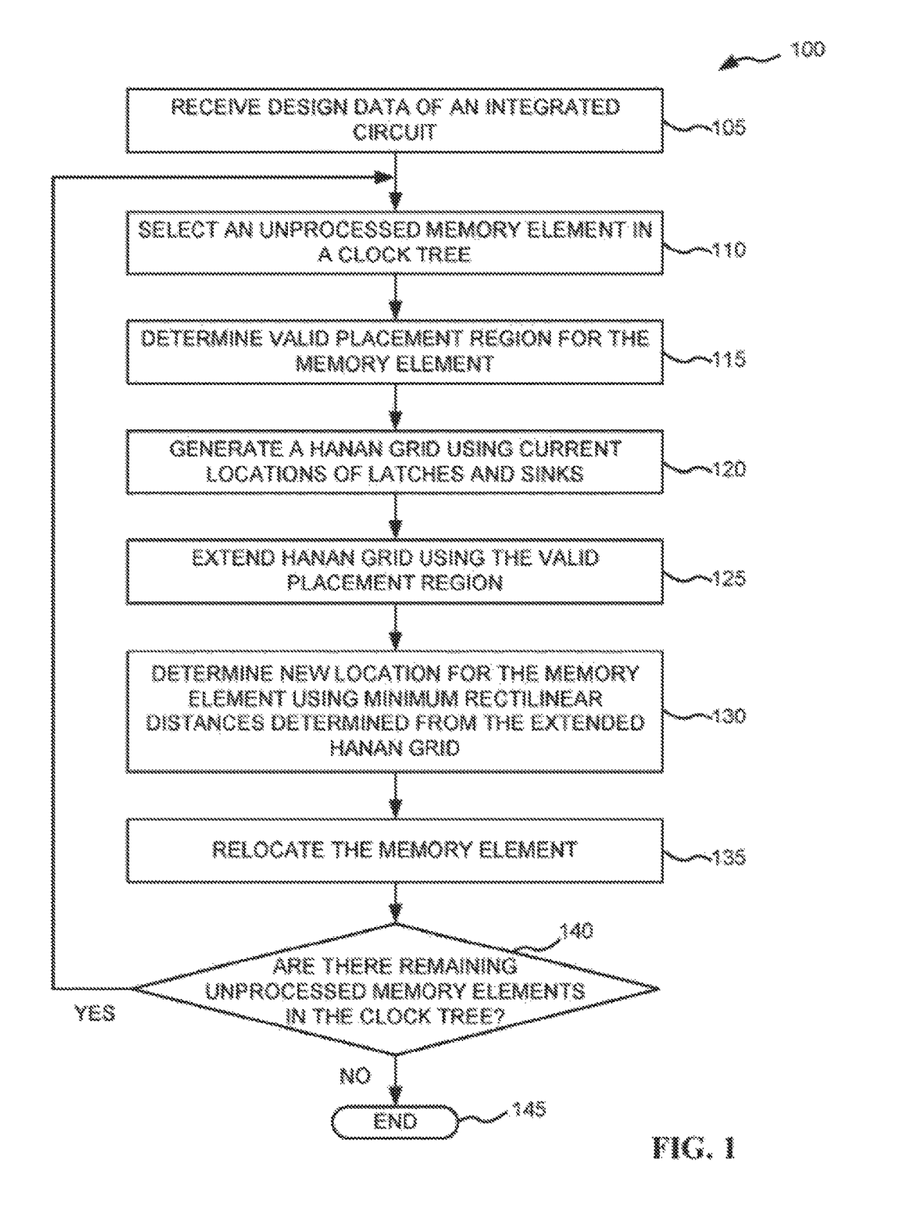
FIG. 1 depicts a set of operations for improving a layout of a clock tree in an integrated circuit design, according to various embodiments.
Figure 6:
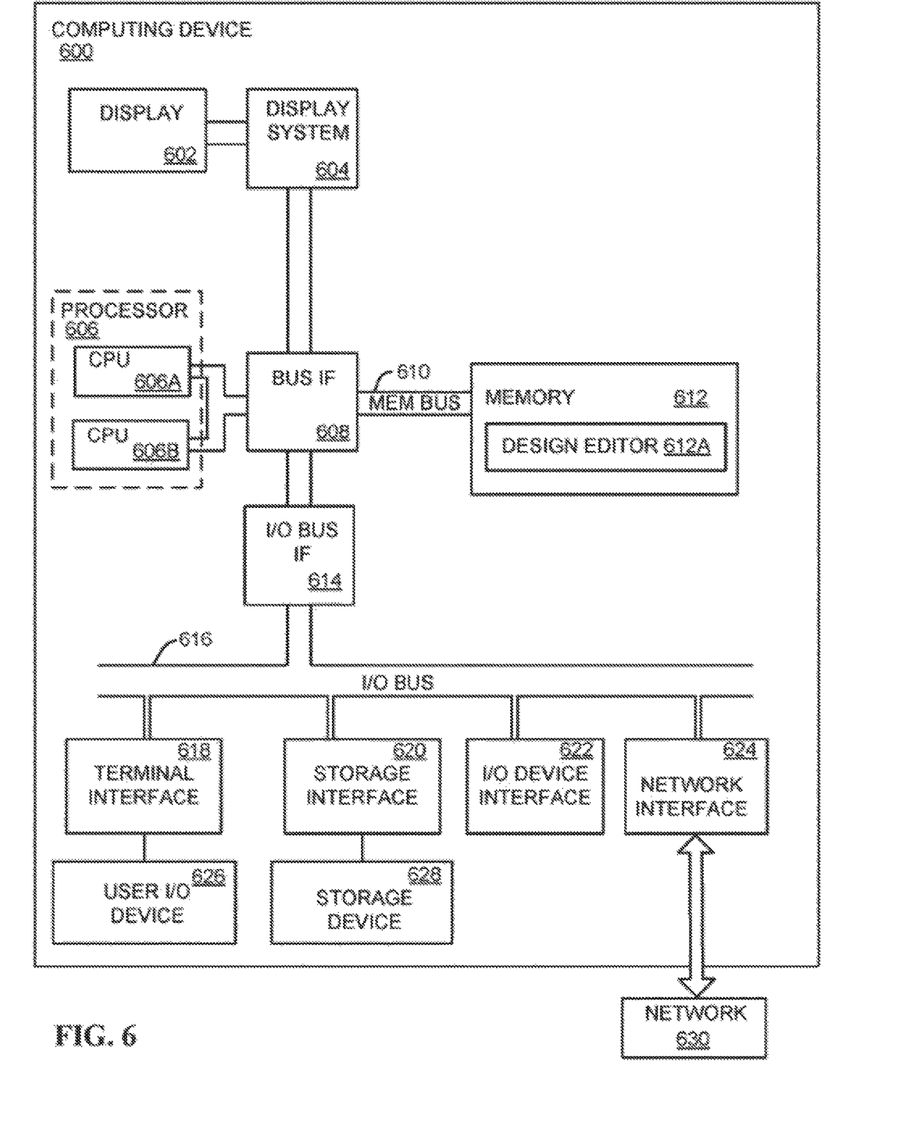
FIG. 6 depicts a block diagram of a system for executing a set of operations for improving a layout of a clock tree in an integrated circuit design, according to various embodiments.

Referring now to the figures, FIG. 1 depicts a set of operations 100 for improving a layout of a clock tree in an integrated circuit design, according to various embodiments. The operations 100 can be executed automatically by a system, including computing devices and software applications (e.g. computer programs, executable software scripts, and firmware modules) configured according to the techniques described herein to reconstruct a clock tree by relocating latches (e.g., memory elements) in the clock tree to, for example, reduce the length of traces connecting elements in the clock tree. In some embodiments, the system includes computer executable code (e.g., a design editor or a clock synthesis tool) executing on one or more processors of a computing device, such as the computing device 600 (FIG. 6). The operations 100 can be executed by the system to improve the layout of a clock tree by reconstructing the clock tree to reduce sub-unit crossings, trace lengths (e.g., wiring lengths), and overall power consumption.

The system can begin the operations 100 by executing operation 105 to receive design data of an integrated circuit. The design data can be a data structure embodying a physical representation of the integrated circuit. The design data, for example, can be a hardware description language file indicating relationships (e.g., timings, physical locations, and couplings) between elements of the integrated circuit. In some embodiments, the design data represents the integrated circuit as set of hierarchical sub-units that partition the area of the integrated circuit. The sub-units can be coupled together by, inter alia, a clock tree comprising as set of latches and terminating at one or more sinks. The clock tree (e.g., a staging tree) can use a set of latches (e.g., staging latches or memory elements) to distribute a control clock signal from, for example, a central source to a clock sink (hereinafter, sink) within each sub-unit.

The system can execute operation 110 to select an unprocessed latch (e.g., memory element) in the clock tree to relocate. Latches in the clock tree can be hierarchically distributed in a chain-like structure such that each latch has a single predecessor latch and one or more successor latch and sinks (e.g., successor elements). Successor latches, and sinks, can form a sub-branch of a given latch. In some embodiments sinks are not considered part of the clock tree. In certain embodiments, the first latch in the clock tree does not have a predecessor latch. In these embodiments, the source of the control clock signal can be considered the predecessor. Selecting a latch for relocation can include traversing the clock tree (e.g., the chain-like structure) from the root and selecting the next unprocessed latch (e.g., a latch that has not been relocated according the techniques of this disclosure) in sequence.

The system can execute operation 115 to determine a valid placement region for relocating the latch. The valid placement region can be an area (e.g., points or locations) on one or more sub-units of the integrated circuit where the selected latch can be relocated without, for example, violating timing requirements of integrated circuit. Other limitations or design requirements can be used to characterize the valid placement region. The valid placement region can be determined using the maximum rectilinear distances that the selected latch can be place from its processor latch and each of its immediate successor latches. In some embodiments, the valid placement region can be determined graphically by constructing (e.g., logically or graphically) a rhombus or diamond figure around the predecessor latch and each immediate successor latch, as showing in FIG. 2. The vertices of the rhombus around a given predecessor or successor latch are determined by the maximum distance (e.g., vertical and horizontal distance) the selected latch can be placed from the predecessor or successor latch. The valid placement region for the selected latch is an area formed by the intersection of each (e.g., all) of the constructed rhombuses. In some embodiments, the valid placement region is limited to those intersecting areas that reside on sub-units of the integrated circuit.

In some embodiments, the system can determine a sub-unit on which to place the relocated the selected latch. The selected sub-unit can be a sub-unit including at least a portion of the valid placement region, and having the fewest number of sub-unit crossings (e.g., the fewest number of clock tree crossing between sub-units). A sub-unit having the fewest number of sub-unit crossings can be selected using, for example, a quadri-section algorithm.

Figure 3:
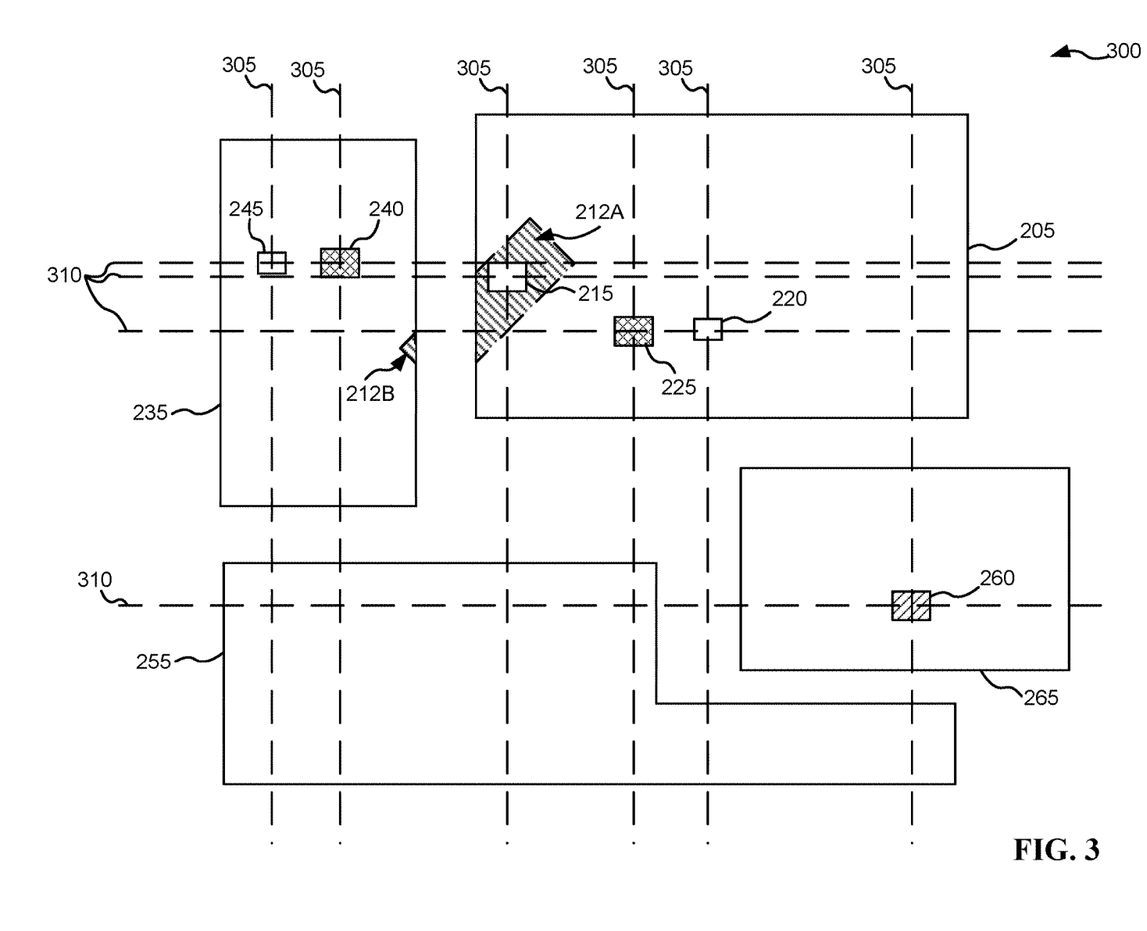
FIG. 3 depicts a block diagram of an example representation of an operation for generating a grid for determining a relocation point for relocating a memory element of a clock tree in an integrated circuit, according to various embodiments.

The system can execute operation 120 to generate a grid using the current locations of latches and sinks. In some embodiments, the grid is a Hanan grid. The grid can be generated using the locations (e.g., points in the physical representation of the integrated circuit) of the predecessor latch, each immediate successor latch, and each sink in a sub-branch of the selected latch as generating points or vertices. Additional vertices (e.g., grid points) completing the grid can be generated by drawing or constructing horizontal and vertical lines (e.g., perpendicularly intersecting lines) through each of the generating points. The intersection of these lines form the additional vertices. An example grid generated according to this operation is shown in FIG. 3. In some embodiments, the grid can be generated logically or mathematically as, for example, a set of grid points or vertices in a data structure. In other embodiments, the can be generated physically or graphically, as shown in FIG. 3.

Figure 4:
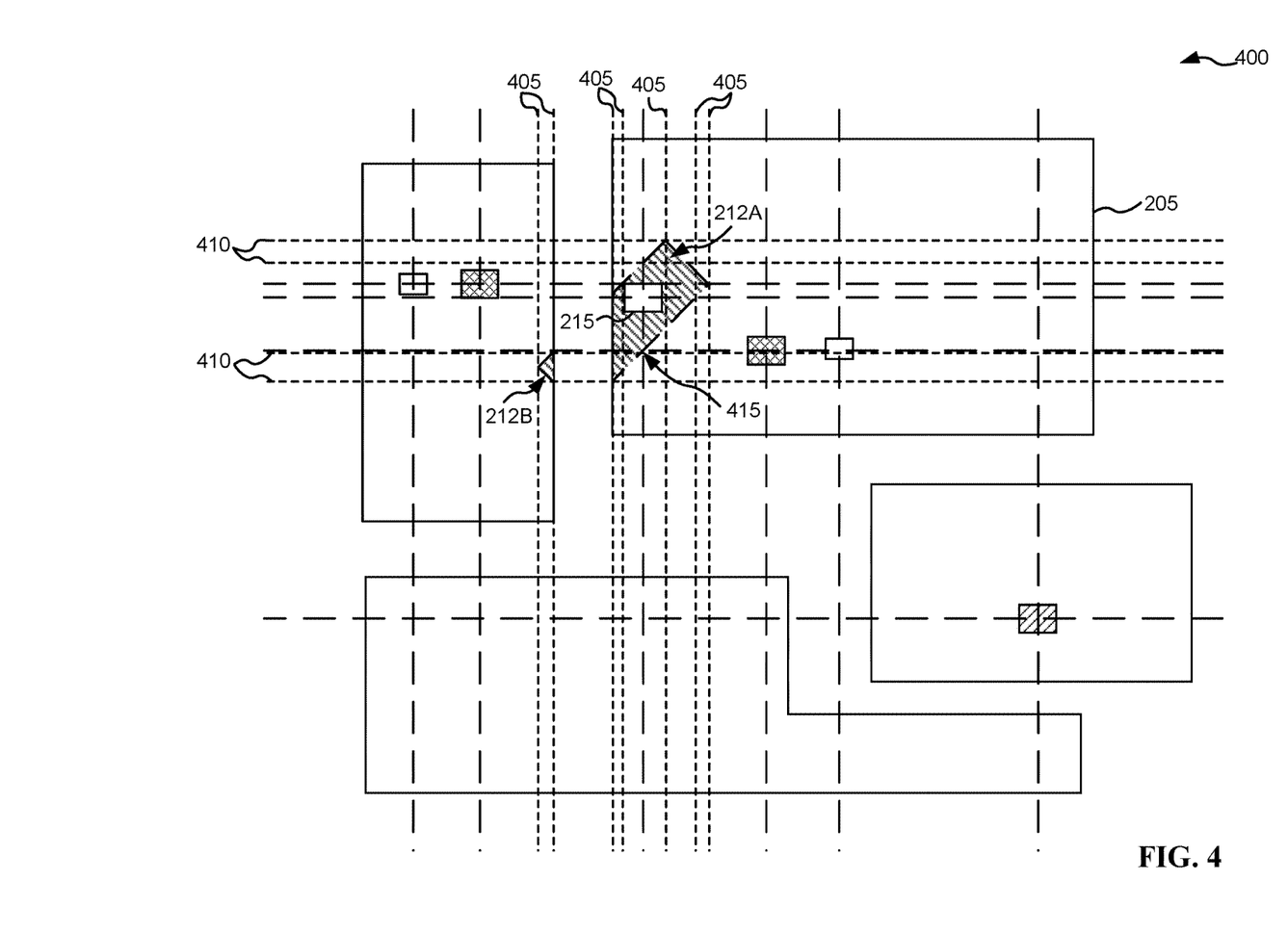
FIG. 4 depicts a block diagram of example implementation of an operation for generating an extended grid for determining a relocation point for relocating a memory element of a clock tree in an integrated circuit, according to various embodiments.

The system can execute operation 125 to extend the grid using the valid placement region determined in operation 115. Extending the grid includes adding a new set of generating points to the initial set of generating points and constructing horizontal and vertical lines through these additional points. The new set of generating points include the vertices of the valid placement region. According to various embodiments, the new set of points further include points formed by the intersection of the initial grid (e.g., vertical and horizontal lines of the initial grid) and edges (e.g., diagonal edges) of the valid placement region. An example extended grid (e.g., an extended Hanan Grid) generated according to operation 125 is shown in FIG. 4.

The system can execute operation 130 to determine a relocation point (e.g., a new location) for the latch selected in operation 110. The relocation point can be a vertex of the extended grid having a minimum total rectilinear distance to the predecessor of the selected latch, each immediate successor of the selected latch, and each sink in in a sub-branch of the selected latch. The vertex is a point within, or on, the valid placement region. The minimum total rectilinear distance can be calculated by determining 1) the minimum rectilinear distance from a vertex of the extended grid to the predecessor of the selected latch, 2) the minimum rectilinear distance from a vertex of the extended grid to each immediate successor of the selected latch, and the minimum rectilinear distance from a vertex of the extended grid to each sink in a sub-branch of the selected latch. Each of these minimum rectilinear distances can then be summed to determine the total minimum rectilinear distance for the given vertex. The vertex laying in the valid placement region and having shortest total minimum rectilinear distance can be selected as the relocation point.

Limiting the possible relocation point to points that are both a vertex of the extended grid and points within the valid placement region reduces the search space for finding minimum rectilinear distances using the extended grid. Additionally, considering only the predecessor of the selected latch, each immediate successor of the selected latch, and each sink in in a sub-branch of the selected latch further reduces the search space. Consequently, the minimum total rectilinear distances determined herein can determined by exhaustively searching the extended grid (e.g., calculating the distances for all possible routes between two latches or points of interest and selecting the shortest distance). Determining the relocation point for the selected latch can therefore include, for each vertex on the extended grid within the valid placement region, 1) determining (e.g., through and exhaustive search) the minimum rectilinear distances from the vertex to the predecessor latch, each immediate successor latch, and each sink in in a sub-branch of the selected latch, 2) summing the minimum rectilinear distances to obtain the minimum total rectilinear distance for the vertex, and 3) selecting a vertex with the minimum total rectilinear distance as the relocation point.

The system can execute operation 135 to relocate the selected latch to the relocation point. Relocating the selected latch can include deleting an instance of the selected from the physical representation of the integrated circuit and generating a new instance of the selected latch at the relocation point. In some embodiments, relocating the selected latch can include modifying fields of a data structure embodying the physical representation of the integrated circuit to change the coordinates of the selected latch. Relocating the selected latch can further include modifying the data structure to adjust the placement of traces coupling the selected latch to the clock tree.

In some embodiments, relocating a selected latch in a clock tree according to the techniques described herein only modifies the location of the selected latch and traces coupling the selected latch to a predecessor latch and immediate successors. Consequently, in these embodiments, newly added branches (e.g., latches) to a clock tree can be improved without having to reconstruct the entire clock tree. Incrementally improving the clock tree according to the techniques described herein can result in improving the clock tree layout by finding the local minimum of the total wiring length for the clock tree at each increment.

The system can execute operation 140 to determine whether there are any remaining unprocessed latches in the clock tree. The system can return to operation 110 and select a new latch from the clock tree to relocate in response to determining that there are unprocessed latches remaining in the clock tree. Alternatively, the system can end the operations 100 at operation 145 in response to determining that there are no remaining unprocessed latches.

Figure 2:
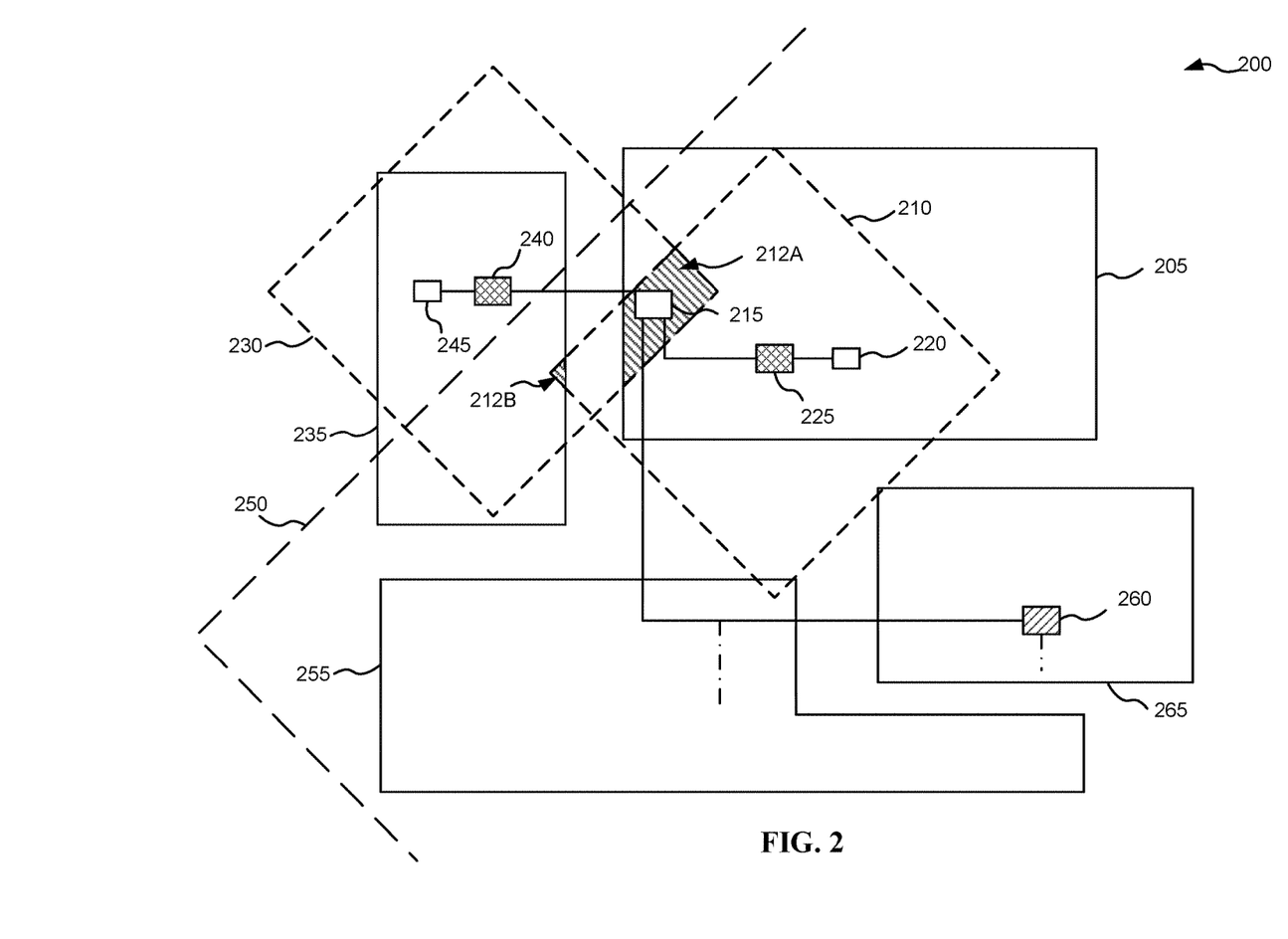
FIG. 2 depicts a block diagram of an example representation of an operation for determining a valid placement region for relocating a memory element of a clock tree in an integrated circuit, according to various embodiments.

FIG. 2 depicts a block diagram 200 of an example representation of an operation for determining a valid placement region for relocating a memory element (e.g., a latch) of a clock tree in an integrated circuit, according to various embodiments. The block diagram can correspond to at least operation 115 of the set of operations 100 (FIG. 1). The block diagram includes an abstraction of a graphical representation of the integrated circuit. The integrated circuit includes sub-units 205, 235, 255, and 265. The integrated circuit further includes a clock tree having latches 215, 225, 240, and 260. The latch 215 is a latch selected for relocation, consistent with operation 110 (FIG. 1). The latch 260 is a predecessor latch of the selected latch 215, while latches 225 and 240 are successor latches. The successor latches 225 and 240 form sub-branches of the selected latch 215, while sinks 220 and 245 are sinks in the sub-branches.

The rhombus 210 delineate the maximum distance area wherein the selected latch 215 can be placed relative to the successor latch 225 without violating requirements (e.g., timing requirements) of the integrated circuit design. Similarly, the rhombus 230 delineate the maximum distance area wherein the selected latch 215 can be place relative to the successor latch 240 without violating requirements of the integrated circuit design. Additionally, the partially shown rhombus 250 delineate the maximum distance area wherein the selected latch 215 can be placed relative to the predecessor latch 260 without violating requirements of the integrated circuit design. The intersection of rhombus 210, 230, and 250 form valid placement region 212A and 212B, as described herein.

FIG. 3 depicts a block diagram 300 of an example representation of an operation for generating a grid (e.g., a Hanan Grid) for determining a relocation point for relocating a memory element of a clock tree in an integrated circuit, according to various embodiments. In some embodiments, FIG. 3 depicts an output generated from executing operation 120 (FIG. 1). In certain embodiments, the output can be generated and stored logically in a data structure, as described herein. The block diagram 300 includes substantially the same abstraction of a graphical representation of integrated circuit shown in FIG. 2. As shown the block diagram 300 the grid is generated by drawing vertical lines 305 and horizontal lines 310 through a set of initial generating points determined by predecessor latch 260, successor latches 225 and 240, and sinks 220 and 245.

FIG. 4 depicts a block diagram 400 of an example representation of an operation for generating an extended grid (e.g., an extended Hanan Grid) for determining a relocation point for relocating a memory element of a clock tree in an integrated circuit, according to various embodiments. In embodiments, the block diagram 400 depicts an output generated from executing operation 125 (FIG. 1). In certain embodiments, the output can be generated and stored logically in a data structure, as described herein. The block diagram shown in FIG. 4 includes substantially the same abstraction of a graphical representation of integrated circuit shown in FIG. 2. As shown in FIG. 4, the extended Hanan Grid is generated by drawing vertical lines 405 and horizontal lines 410 through an additional set of generating points. The additional set of generating points are defined by the vertices of the valid placement region 212A and 212B, and the intersection of the valid placement region with the initial grid shown in FIG. 3.

Consistent with operation 130 (FIG. 1), the vertex 415 in the extended grid can be selected as the relocation point for the selected latch 215. The vertex 415, for example, can be a point on the extended grid that intersects the valid placement region 212A and has the minimum total rectilinear distance to the predecessor latch, the successor latches and the sinks.

Figure 5:
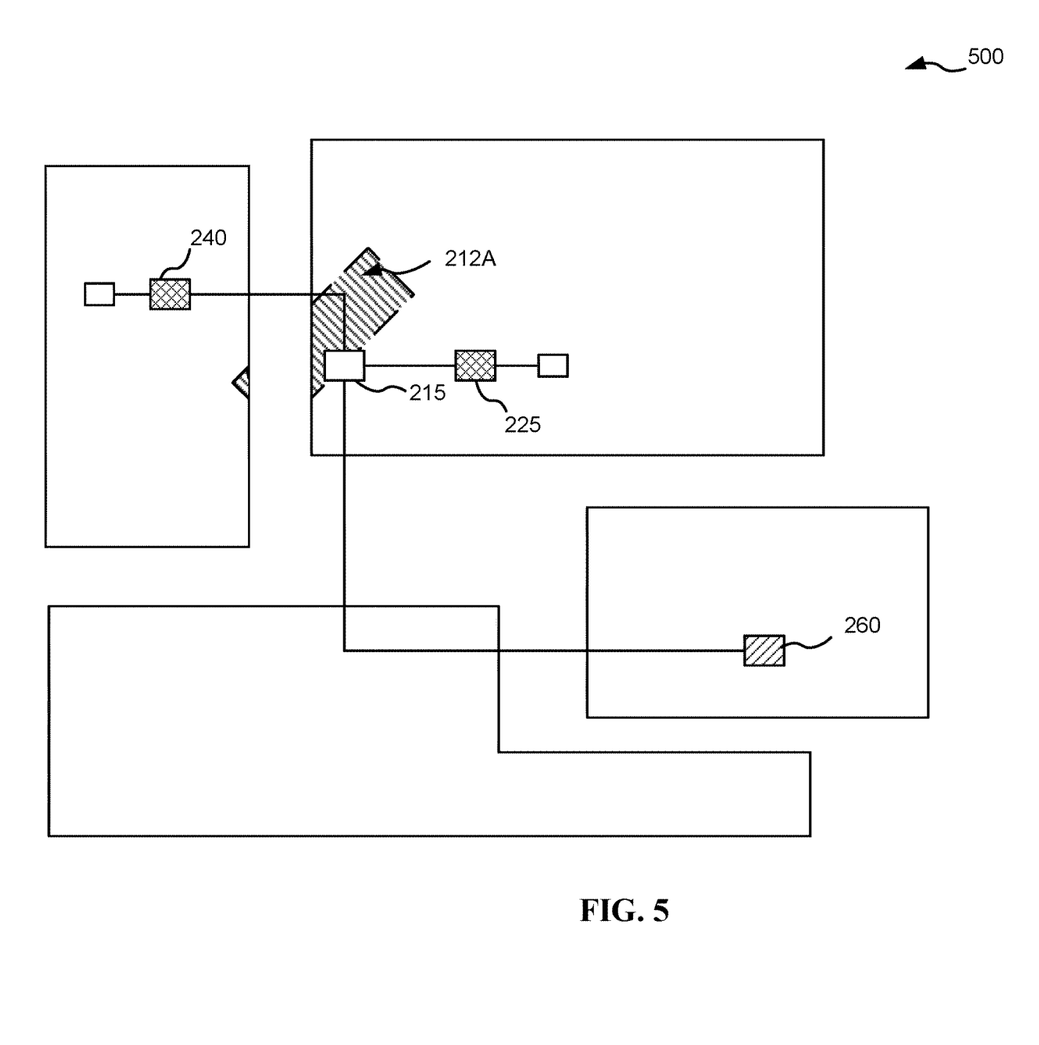
FIG. 5 depicts a block diagram of an improved layout of a clock tree in an integrated circuit, according to various embodiments.

FIG. 5 depicts a block diagram 500 of an improved layout of a clock tree in an integrated circuit, according to various embodiments. In embodiments, FIG. 5 depicts an output generated from executing operation 135 (FIG. 1). In certain embodiments, the output can be generated and stored logically in a data structure, as described herein. The block diagram 500 includes substantially the same abstraction of a graphical representation of integrated circuit shown in FIG. 2. As depicted the block diagram 500, the selected latch 215 is relocated to vertex 415 (FIG. 4) within the valid placement region 212A. Relocating the selected latch 215 includes redrawing traces coupling the selected latch to predecessor latch 260, and successor latches 225 and 240.

FIG. 6 depicts a block diagram of a system for executing a set of operations for improving a layout of a clock tree in an integrated circuit design, according to various embodiments. The components of the computing device 600 can include one or more processors 606, a memory 612, a terminal interface 618, a storage interface 620, an Input/Output ("I/O") device interface 622, and a network interface 624, all of which are communicatively coupled, directly or indirectly, for inter-component communication via a memory bus 610, an I/O bus 616, bus interface unit ("IF") 608, and an I/O bus interface unit 614.

The computing device 600 may include one or more general-purpose programmable central processing units (CPUs) 606A and 606B, herein generically referred to as the processor 606. In an embodiment, the computing device 600 may contain multiple processors; however, in another embodiment, the computing device 600 may alternatively be a single CPU device. Each processor 606 executes instructions stored in the memory 612.

The computing device 600 may include a bus interface unit 608 to handle communications among the processor 606, the memory 612, the display system 604, and the I/O bus interface unit 614. The I/O bus interface unit 614 may be coupled with the I/O bus 616 for transferring data to and from the various I/O units. The I/O bus interface unit 114 may communicate with multiple I/O interface units 618, 620, 622, and 624, which are also known as I/O processors (IOPs) or I/O adapters (IOAs), through the I/O bus 616. The display system 604 may include a display controller, a display memory, or both. The display controller may provide video, audio, or both types of data to a display device 602. The display memory may be a dedicated memory for buffering video data. The display system 104 may be coupled with a display device 602, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 604 may be on board an integrated circuit that also includes the processor 606. In addition, one or more of the functions provided by the bus interface unit 608 may be on board an integrated circuit that also includes the processor 606.

The I/O interface units support communication with a variety of storage and I/O devices. For example, the terminal interface unit 618 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 626 and the computing device 600, may receive output data via the user output devices. For example, a user interface may be presented via the user I/O device 626, such as displayed on a display device, played via a speaker, or printed via a printer.

The storage interface 620 supports the attachment of one or more disk drives or direct access storage devices 628 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 628 may be implemented via any type of secondary storage device. The contents of the memory 612, or any portion thereof, may be stored to and retrieved from the storage device 628 as needed. The I/O device interface 622 provides an interface to any of various other I/O devices or devices of other types, such as printers or fax machines. The network interface 624 provides one or more communication paths from the computing device 600 to other digital devices and computer systems.

Although the computing device 600 shown in FIG. 6 illustrates a particular bus structure providing a direct communication path among the processors 606, the memory 612, the bus interface 608, the display system 604, and the I/O bus interface unit 614, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 614 and the I/O bus 608 are shown as single respective units, the computing device 600, may include multiple I/O bus interface units 614 and/or multiple I/O buses 616. While multiple I/O interface units are shown, which separate the I/O bus 616 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device.

In an embodiment, the memory 612 may include a random-access semiconductor memory, storage device, or storage medium (either volatile or non-volatile) for storing or encoding data and programs. In another embodiment, the memory 612 represents the entire virtual memory of the computing device 600, and may also include the virtual memory of other computer systems coupled to the computing device 600 or connected via a network 630. The memory 612 may be a single monolithic entity, but in other embodiments the memory 612 may include a hierarchy of caches and other memory devices. For example, memory may exist in multiple levels of caches, and these caches may be further divided by function, so that one cache holds instructions while another holds non-instruction data, which is used by the processor. Memory 612 may be further distributed and associated with different CPUs or sets of CPUs, as is known in any various so-called non-uniform memory access (NUMA) computer architectures.

The memory 612 may store all or a portion of the components and data shown in FIG. 1-4. The memory 612, for example, can include design editor 612A having computer executable code for implementing or executing the techniques and operations described herein. These programs and data structures are illustrated in FIG. 1-4 as being included within the memory 612 in the computing device 600; however, in other embodiments, some or all of them may be on different computer systems and may be accessed remotely, e.g., via a network 630. The computing device 600 may use virtual addressing mechanisms that allow the programs of the computing device 600 to behave as if they only have access to a large, single storage entity instead of access to multiple, smaller storage entities. Thus, while the components and data shown in FIG. 1-4 are illustrated as being included within the memory 612, these components and data are not necessarily all completely contained in the same storage device at the same time. Although the components and data shown in FIG. 1-4 are illustrated as being separate entities, in other embodiments some of them, portions of some of them, or all of them may be packaged together.

In an embodiment, the components and data shown in FIG. 1-4 may include instructions or statements that execute on the processor 606 or instructions or statements that are interpreted by instructions or statements that execute the processor 606 to carry out the functions as further described below. In another embodiment, the components shown in FIG. 1-4 may be implemented in hardware via semiconductor devices, chips, logical gates, circuits, circuit cards, and/or other physical hardware devices in lieu of, or in addition to, a processor-based system. In an embodiment, the components shown in FIG. 1-4 may include data in addition to instructions or statements.

FIG. 6 is intended to depict representative components of the computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for improving a layout of a clock tree in an integrated circuit, the method comprising:
   Receiving, at a computing device, design data of the integrated circuit, the design data indicating:
   a set of sub-units partitioning an area of the integrated circuit, and
   a clock tree coupling the sub-units, the clock tree having a selected memory element, a predecessor memory element, and successor elements;
   determining, via the computing device, a valid placement region for relocating the selected memory element;
   generating, via the computing device, a grid comprising a first set of perpendicularly intersecting lines through the selected memory element, the predecessor memory element, and the successor elements;
   extending, via the computing device, the grid to include a second set of perpendicularly intersecting lines through vertices of the valid placement region and through intersections between edges of the valid placement region and the first set of perpendicularly intersecting lines;
   determining, via the computing device within the valid placement region, a point in the extended grid having a minimum total rectilinear distance to the predecessor memory element and to the successor elements; and
   relocating the selected memory element to the determined point.

2. The method of claim 1, wherein the selected memory element includes immediate successor memory elements, and determining the valid placement region includes:
   determining a first maximum distance region around the predecessor memory element;
   determining second maximum distance regions around each immediate successor memory elements; and
   determining the valid placement region based on intersections of the first maximum distance region and the second maximum distance regions.

3. The method of claim 2, wherein a maximum distance region indicates a maximum rectilinear distance for placing a first memory element from a second memory element without violating timing requirements of the integrated circuit.

4. The method of claim 2, wherein a maximum distance region comprises a rhombus.

5. The method of claim 1, further comprising:
   selecting, prior to generating the grid, a sub-unit in the set of sub-units on which to place the selected memory element, the sub-unit selected to reduce clock tree crossings between subunits.

6. The method of claim 1, wherein the clock tree is a staging tree and the memory elements are latches.

7. The method of claim 1, wherein relocating the selected memory element to the determined point includes reducing a wiring length of the clock tree.

8. The method of claim 1, wherein the grid comprising a first set of perpendicularly intersecting lines is a Hanan Grid.

9. The method of claim 1, wherein the successor elements include immediate successor memory elements, and one or more sinks.

10. A system for improving a layout of a clock tree in an integrated circuit, this system comprising:
    one or more computing nodes having a memory and a processor; and
    a non-transitory computer readable storage medium of the one or more computing nodes having program instructions embodied therewith, the program instructions executable by the processor to cause the system to:
    receive design data of the integrated circuit, the design data indicating:
    a set of sub-units partitioning an area of the integrated circuit, and a clock tree coupling the sub-units, the clock tree having a selected memory element, a predecessor memory element, and successor elements;

determine a valid placement region for relocating the selected memory element;

generate grid comprising a first set of perpendicularly intersecting lines through the selected memory element, the predecessor memory element, and the successor elements;

extend the grid to include a second set of perpendicularly intersecting lines through vertices of the valid placement region and through intersections between edges of the valid placement region and the first set of perpendicularly intersecting lines;

determine, within the valid placement region, a point in the extended grid having a minimum total rectilinear distance to the predecessor memory element and to the successor elements; and relocate the selected memory element to the determined point.

11. The system of claim 10, wherein the selected memory element includes immediate successor memory elements, and wherein the program instructions are further executable by the processor to cause the system to:

determine a first maximum distance region around the predecessor memory element;

determine second maximum distance regions around each immediate successor memory elements; and determine the valid placement region based on intersections of the first maximum distance region and the second maximum distance regions.

12. The system of claim 11, wherein a maximum distance region indicates a maximum rectilinear distance for placing a first memory element from a second memory element without violating timing requirements of the integrated circuit.

13. The system of claim 11, wherein a maximum distance region comprises a rhombus.

14. The system of claim 10, program instructions are further executable by the processor to cause the system to:

select, prior to generating the grid, a sub-unit in the set of sub-units on which to place the selected memory element, the sub-unit selected to reduce clock tree crossings between subunits.

15. The system of claim 10, wherein the clock tree is a staging tree and the memory elements are latches.

16. The system of claim 10, wherein relocating the selected memory element to the determined point includes reducing a wiring length of the clock tree.

17. The system of claim 10, wherein the grid comprising a first set of perpendicularly intersecting lines is a Hanan Grid.

18. The system of claim 10, wherein the successor elements include immediate successor memory elements, and one or more sinks.

19. A computer program product for improving a layout of a clock tree in an integrated circuit, the computer program product including a computer readable storage medium having program instructions embodied therewith, wherein the computer readable storage medium is not a transitory signal per se, the program instructions executable by a processing circuit to cause the processing circuit to perform a method comprising:

receiving design data of the integrated circuit, the design data indicating:
  a set of sub-units partitioning an area of the integrated circuit, and
  a clock tree coupling the sub-units, the clock tree having a selected memory element, a predecessor memory element, and successor elements;

determining a valid placement region for relocating the selected memory element;

generating grid comprising a first set of perpendicularly intersecting lines through the selected memory element, the predecessor memory element, and the successor elements;

extending the grid to include a second set of perpendicularly intersecting lines through vertices of the valid placement region and through intersections between edges of the valid placement region and the first set of perpendicularly intersecting lines;

determining, within the valid placement region, a point in the extended grid having a minimum total rectilinear distance to the predecessor memory element and to the successor elements; and relocating the selected memory element to the determined point.

20. The computer program product of claim 19, wherein the selected memory element includes immediate successor memory elements, and determining the valid placement region includes:

determining a first maximum distance region around the predecessor memory element;

determining second maximum distance regions around each immediate successor memory elements; and determining the valid placement region based on intersections of the first maximum distance region and the second maximum distance regions.

* * * * *